United States Patent
Lappeteläinen et al.

(10) Patent No.: US 8,914,867 B2
(45) Date of Patent: Dec. 16, 2014

(54) METHOD AND APPARATUS FOR REDIRECTING DATA TRAFFIC

(75) Inventors: Antti Tuomas Lappeteläinen, Espoo (FI); Juha-Matti Tuupola, Tampere (FI); Timo Eriksson, Espoo (FI); Mikko Hurskainen, Helsinki (FI); Risto Suoranta, Tampere (FI); Antti Latva-Aho, Lempaala (FI); Pasi Katajainen, Tampere (FI)

(73) Assignee: Notava Oy, Espoo (FI)

( * ) Notice: Subject to any disclaimer, the term of this patent is extended or adjusted under 35 U.S.C. 154(b) by 107 days.

(21) Appl. No.: 13/577,489

(22) PCT Filed: Dec. 22, 2010

(86) PCT No.: PCT/FI2010/051079
§ 371 (c)(1),
(2), (4) Date: Oct. 22, 2012

(87) PCT Pub. No.: WO2011/098660
PCT Pub. Date: Aug. 18, 2011

(65) Prior Publication Data
US 2013/0042316 A1 Feb. 14, 2013

(30) Foreign Application Priority Data

Feb. 12, 2010 (FI) ...................................... 20100057

(51) Int. Cl.
*G06F 7/04* (2006.01)
(Continued)

(52) U.S. Cl.
CPC .............. *H04W 12/04* (2013.01); *H04W 88/06* (2013.01); *H04W 12/06* (2013.01); *H04W 48/18* (2013.01); *H04L 63/0442* (2013.01); *H04L 63/0823* (2013.01)
USPC ............................................ 726/10; 713/169

(58) Field of Classification Search
CPC ............ H04L 63/0807; H04L 63/0823; H04L 9/3294; H04L 63/0815; H04L 63/0442; G06F 21/33; H04W 88/06
USPC ............... 726/9, 10, 11, 19, 2, 3, 4, 5, 17, 18; 713/151, 156, 169, 171, 184; 705/34, 705/37, 54; 380/277
See application file for complete search history.

(56) References Cited

U.S. PATENT DOCUMENTS 5,802,502 A * 9/1998 Gell et al. ....................... 705/37
7,874,014 B2 * 1/2011 Maeda ............................ 726/29
(Continued)

FOREIGN PATENT DOCUMENTS

| WO | 2004/062114 A2 | 7/2004 |
| WO | 2005/089249 A2 | 9/2005 |
| WO | 2009043048 | 4/2009 |

OTHER PUBLICATIONS

Finnish Search Report, dated Oct. 11, 2010, from corresponding Finnish application.

(Continued)

*Primary Examiner* — Abu Sholeman
(74) *Attorney, Agent, or Firm* — Young & Thompson

(57) ABSTRACT

A method and apparatus for redirecting data traffic are provided. The method includes receiving a service request from a first device, allocating resources for the service, associating the resources with a first unique identifier, confirming the service request with the first device, receiving a connection request from a second device including the first unique identifier and an authentication certificate, passing the authentication certificate to the first device, and receiving an authentication confirmation from the first device. The method further includes, in response to receiving the authentication confirmation, accepting the connection request from the second device, providing an indication regarding at least one local area network to the second device, and providing required credentials associated with the at least one local area network to the second device.

13 Claims, 11 Drawing Sheets

(51) Int. Cl.
*H04L 9/32* (2006.01)
*H04W 12/04* (2009.01)
*H04W 48/18* (2009.01)
*H04W 88/06* (2009.01)
*H04W 12/06* (2009.01)
*H04L 29/06* (2006.01)

(56) References Cited

U.S. PATENT DOCUMENTS

| | | | |
|---|---|---|---|
| 8,505,083 B2 * | 8/2013 | Kuzin et al. | 726/8 |
| 2004/0023669 A1 | 2/2004 | Reddy | |
| 2004/0117818 A1 * | 6/2004 | Karaoguz et al. | 725/31 |
| 2004/0235455 A1 | 11/2004 | Jiang et al. | |
| 2006/0156391 A1 * | 7/2006 | Salowey | 726/5 |
| 2007/0143398 A1 * | 6/2007 | Graham | 709/204 |
| 2007/0260875 A1 * | 11/2007 | Raghunath et al. | 713/156 |
| 2008/0189544 A1 * | 8/2008 | Raghunath et al. | 713/156 |
| 2008/0256605 A1 * | 10/2008 | Malinen | 726/4 |
| 2009/0037729 A1 * | 2/2009 | Smith et al. | 713/158 |
| 2009/0099916 A1 * | 4/2009 | Garbow et al. | 705/14 |
| 2010/0003975 A1 | 1/2010 | Barankanira et al. | |
| 2010/0083356 A1 * | 4/2010 | Steckley et al. | 726/5 |
| 2011/0302019 A1 * | 12/2011 | Proctor et al. | 705/14.27 |
| 2012/0084570 A1 * | 4/2012 | Kuzin et al. | 713/182 |
| 2013/0028074 A1 * | 1/2013 | Banner et al. | 370/218 |
| 2013/0174230 A1 * | 7/2013 | Karaoguz et al. | 726/4 |
| 2013/0276082 A1 * | 10/2013 | Kuang et al. | 726/7 |
| 2013/0282792 A1 * | 10/2013 | Graham | 709/203 |
| 2013/0322329 A1 * | 12/2013 | Visuri et al. | 370/328 |
| 2013/0322400 A1 * | 12/2013 | Visuri et al. | 370/331 |
| 2014/0003404 A1 * | 1/2014 | Gillett et al. | 370/338 |
| 2014/0113628 A1 * | 4/2014 | Sundararajan et al. | 455/435.2 |

OTHER PUBLICATIONS

International Search Report dated Jun. 21, 2011, corresponding to PCT/FI2010/051079.

* cited by examiner

METHOD AND APPARATUS FOR REDIRECTING DATA TRAFFIC

TECHNICAL FIELD

The present invention relates to redirecting of data traffic.

BACKGROUND

Second generation (2G) and third generation (3G or 3.5G) wide area networks are widely spread all over the world and provide varying capabilities for mobile applications in terms of bandwidth, coverage and latency. Typically these mobile networks provide data rates that are generally adequate for services employing a low to medium bandwidth applications such as voice communications, text messaging, instant messaging, e-mail with no or relatively small attachments. The data access rates tend to be marginal for services that demand or would otherwise benefit from a higher bandwidth such as multimedia streaming, rich content web browsing, or large file downloads. The greatest advantages of these networks are mobility and the wide area coverage except indoors. On the contrary wireless local area networks (WLAN) offer far better data rates and are today extensively deployed especially in metropolitan areas. The capabilities of mobile devices are growing fast and more advanced devices are consuming more bandwidth in the networks they operate. These devices, iPhone as a prime example, are equipped with both wide area connectivity and local area connectivity and applications such as web browsers and multimedia streaming applications. This requirement of bandwidth sets new challenges to wide area networks thus mechanisms are needed to balance the load off to local area networks with much greater bandwidth capacity. As wide area data market has become very competitive with flat date offerings the operators have difficulties to justify the additional investment in wide area infrastructure.

Therefore there is a need the consumer friendly empowerment of the operator to off-load selected customers to security enabled wireless local area network that is already installed in the indoor environment the customers are. Thus, the solution improves the capacity of all operator consumers affected by the congestion. The preferred embodiments of the invention realize an instance of a broker machine that reacts on information from wide area network management systems and holistically & cost efficiently manages the congestion problem. The management happens by selecting the most suitable local area operator and initiating the formation of NoTA virtual device concept between the selected mobile devices and a server attached with the selected local area network. The selection of the most suitable local area operator can happen based on location information, existing pricing contracts between the wide and local are operators or in an on-line auction.

SUMMARY

In accordance of the first aspect of the invention, a method comprising, receiving a service request from a first device, allocating resources for said service, associating said resources with a first unique identifier, confirming said service request with said first device, receiving a connection request from a second device comprising the first unique identifier and an authentication certificate, passing said authentication certificate to the first device, and receiving an authentication confirmation from the first device is provided. The method further comprises, in response to receiving said authentication confirmation, accepting said connection request from the second device, providing an indication regarding at least one local area network to the second device, and providing required credentials associated with said at least one local area network to the second device.

According to the second aspect of the invention, an apparatus comprising a processor system comprising one or more processors capable to execute program code and at least one memory comprising computer program code is provided. Said computer program code is configured to, when executed by the processor system, cause the apparatus to receive a service request from a first device, allocate resources for said task, associate said resources with a first unique identifier, confirm said service request with said first device, receive, from a second device, a connection request comprising the first unique identifier and an authentication certificate, pass said authentication certificate to the first device, and receive an authentication confirmation from the first device. Said computer program code is further configured to, when executed by the processor system, cause the apparatus to, in response to reception of said authentication confirmation, accept said connection request from the second device, provide an indication regarding at least one local area network to said second device, and provide required credentials associated with said at least one local area network to the second device.

The preferred embodiments of the present invention may include at least a method, computer program, computer and system for receiving a task request from a client manager server. The task request may include detailed identification information about a specific mobile client that the task is targeted or a list of such details about multiple mobile clients. The identification information may, according to at least one embodiment of the present invention, include an action command, position information, security measures and a unique task identifier. In one embodiment of the invention the position information is a cell identification of a wide area network. Further, in an embodiment of the invention the received command relates to the intent of the sender whether the mobile subscription in place should off-load its data traffic to a local area network or off-load from the local area network. An example of the local is network is IEEE 802.11 based Wi-Fi networks.

According to at least one embodiment of the present invention once a task request has been received, adequate computing resources are reserved to service the task following a confirmation message sending to the originator of the task request. Further the resource allocated to serve the task may be assigned with a unique identifier received from the same originator of the task request. The allocated resources may also be considered valid and reserved for a specific time and invalidated by the network manager. According to various embodiments of the present invention the time value is received a part of the task request. In at least one embodiment of the present invention, the client manager server sending the task requests may be authenticated by the network manager server, receiving the said task request, using a digital certificate and a public key infrastructure.

In at least one embodiment of the present invention, the network manager server listens for a connection establishment request from a mobile client after successful allocation of task resources. The listening process may be protected by security measures that according to various embodiments of the present invention may be configured by the values provided in the task request. Such security measures may be for example a time window, in which the connection request should be received to be considered valid or a fixed amount of trials for such connections requests. Further, according to various embodiments of the invention the server listens for connections that address the Universal Resource Identifier (URI), which is a combination of the server address and the task identifier received in the task request.

According to at least one embodiment of the present invention the mobile client may open a connection to the network server using the said URI and provide a digital certificate that the network server then forwards to the client manager server for authentication. Further the client manager provides a confirmation about the authentication status and if positive the connection request from the mobile client is accepted. The established communication session with mobile client may, in accordance with various configurations of the present invention, later include exchanging of messages providing further information about the identities of the available wireless local area networks within the vicinity of the mobile client. Further, the message exchange may include client position information, security scheme, keys needed to establish connection to the available local area networks, or a specific expiry time for the network access.

DETAILED DESCRIPTION

Example of a method, apparatus and computer program for managing network congestion with operator controlled off-load scheme are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement.

As used herein, the term Client Manager (CM) refers to a physical component or set of physical components, e.g. computer hardware, networking infrastructure, and computer software, that provide the means for the wide area network operator to manage the network selection of its subscribers. As used herein, the term Network Manager (NM) refers to a physical component or set of physical components, e.g. computer hardware, networking infrastructure, and computer software, that provide the means for the local area network operator to manage the network selection, providing information about the network related details such as access credentials, and manage client authentication. Herein, the term Client (CL) includes, but is not limited to, a station, a mobile station, user equipment, or a mobile subscriber unit, or any other type of device capable of operating in wireless communication environments. Also, herein, the term WLAN refers to an IEEE 802.11 based wireless communication system and the term 3G refers to a Universal Mobile Telecommunications System (UMTS) wireless communication system. Furthermore the term Wi-Fi is used hereafter to mean Internet access using said WLAN technology.

The preferred embodiments of the present invention facilitates methods for performing data off-load from one wireless communication system to another wireless communication system using at least two different communication protocols. The wireless communication systems may be any type of present or future developed wireless communication systems, but not limited to UMTS, High-Speed Packet Access (HSPA), Global System for Mobile Communications (GSM), General Packet Radio Services (GPRS), Code Division Multiple Access 2000 (CDMA2000), and IEEE 802.11 based WLAN systems.

For the purposes of explanation simplicity the example embodiments is described with reference to a 3G system and a WLAN communication system that provides a network, or a hot spot, within the coverage of 3G system. However, as aforementioned, the preferred embodiments of the present invention also apply to other wireless communication systems as well. The operators benefiting from CM include all 3G cellular network operators.

Operating Environment

Figure 1:
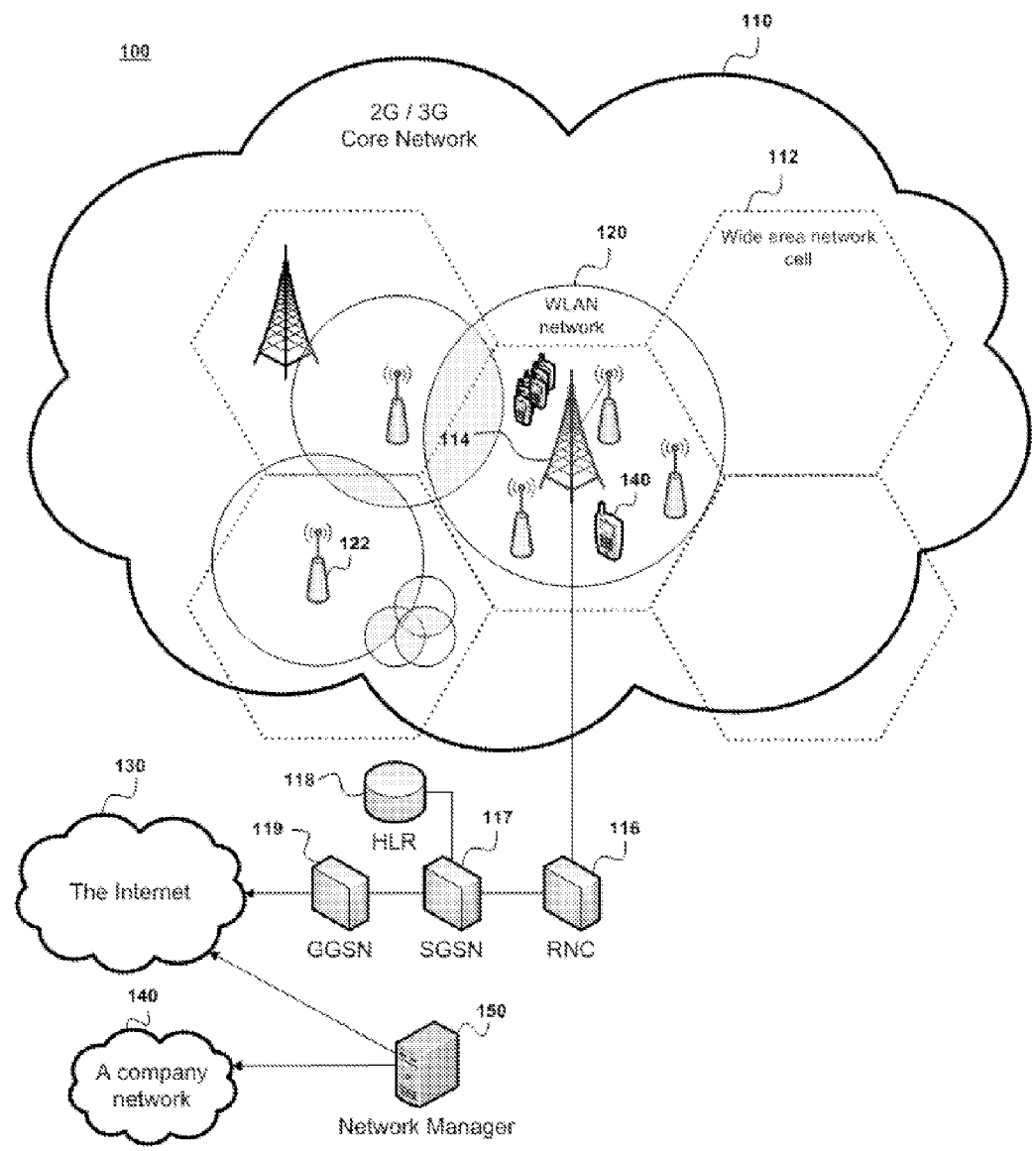
FIG. 1 is a block diagram showing the elements of the wireless wide area and local area communication systems.

FIG. 1 is a wireless communication system 100 in accordance with at least one embodiment of the present invention. The system 100 comprise of two or more communication systems having overlapping coverage area and having at least two communications protocols. FIG. 1 presents a 3G system 110 and a WLAN system 120 where the 3G system has a wider coverage compared to a WLAN system within the 3G coverage area. The 3G system is composed of plurality of cells 112, each of which is served by a base station 114. Further, the 3G system comprises network elements RNC 116, SGSN 117, HLR 118, and GGSN 119 to connect to the Internet 130. The WLAN system 120 comprises access points (AP) 122 that serve the clients 140 using the WLAN system 120. FIG. 1 also present the problem where base station 114 serving multiple clients 140 may result in congestion where the data throughput of clients 140 drops to an unacceptable level. In most cases the area covered by the cell 112 also have WLAN networks 120. The WLAN system 120 may be managed by the operator of the 3G system 110 or by some other operator of similar 3G or other wide area wireless system, or private individuals.

Furthermore, those skilled in art will recognize that the FIG. 1 do not depict all the necessary network devices and equipment necessary for system 100 to operate fully but only those system blocks and logical entities particularly relevant to the description of embodiments of the present invention. Those skilled in art are aware of the many ways the necessary components can be implemented.

System Description

Figure 2:
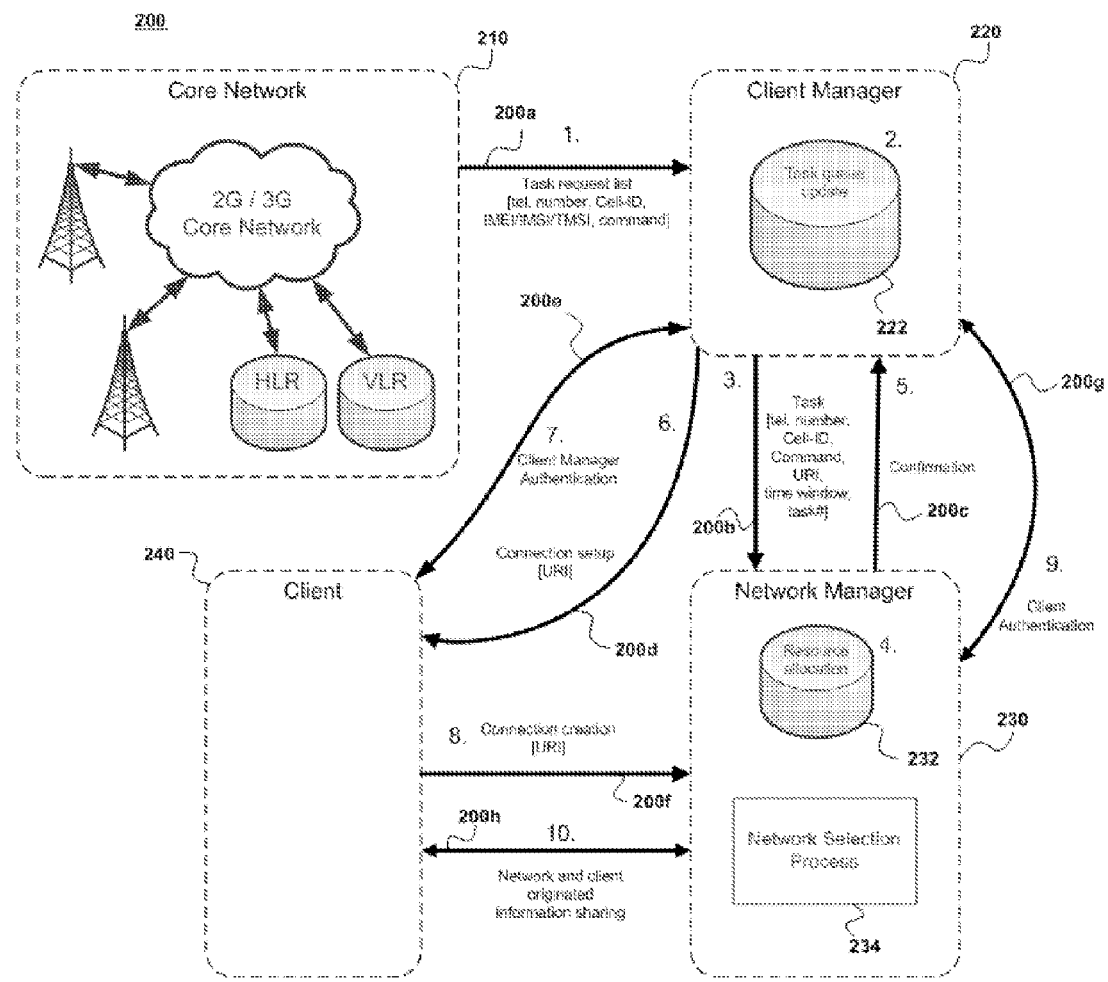
FIG. 2 is a block diagram of the overall system architecture and related interaction in accordance with the preferred embodiments of the present invention.

FIG. 2 disclose an system architecture 200 according to various embodiments of the present invention. The architecture 200 comprise of four main elements of which a core network 210, presents the wide area network and its relevant components such as base station 114, RNC 116, SGSN 117, HLR 118, and GGSN 119. Client Manager 220 is the aforementioned system that provides the means for the core network 210 operators to manage the network selection of its subscribers. Network Manager 230 is the aforementioned system that provides means for the WLAN 120 operators to manage the network selection of the client 240, providing information about the network related details such as access credentials, and manage client 240 authentication. The FIG. 2 also presents high level messaging and information passing functions, with relevant phase, of the system 200.

FIG. 2 is explained hereafter according to at least one embodiment of the present invention. The scenario starts with the assumption that the 3G core network 210 is serving a growing amount of subscribers 240 that are consuming the data transfer capacity of the network 210 eventually leading in to a congestion situation where the network becomes overloaded. The bottle neck of the system performance may be for example the RNC 116, SGSN 117, or GGSN 118 or any other component or combination of components in the core network. The operator of such network could gain knowledge about the network congestion by gathering information about subscribers within each cell 112 and about the network itself. This information could be for example load in the network, base station 114 locations, data usage pattern, or user profiles. Based on this advanced knowledge the core network could implement hardware, software, or both that is able to put together a task list update request 200a to the Client Manager 220. The main function of the request is to identify potential subscribers within a specific cell 112 that would benefit from using possibly available WLAN network 120 instead of continue using 3G network 110 for data exchange in the Internet. Such task list update request 200a may contain information such as telephone number of the subscriber, cell-id of the 3G cell where it is currently operating, IMEI/IMSI/TMSI code of the subscriber, and a 3G operator preferred action state to be associated with the subscriber. The action state in the most simplest form may be a 'ON'/'OFF' command string wherein the 'OFF' means that the network operator suggests that the subscriber should off-load from the 3G network and on the contrary 'ON' means that the network operator suggests that the subscriber should on-load back to 3G network. Here the term off-load refers to directing data traffic out from the 3G network to some other network and on-load refers to directing data traffic in to the 3G network form some other network.

The second entity in the system is a connection manager (CM) 220. The CM 220 could be for example a network server running in the Internet with capabilities to process task list update requests 200a from core network 210. Upon receiving a task list update request 200a the CM 220 will process the content of the request and update its internal data records 222. This processing may include assigning a unique task identifier for the received task and combining that with the information received in task list update request 200a. After the internal processing the CM 220 looks for relevant network manager (NM) 230 instances from its internal NM database where the measurement of relevance may be the location of the subscriber, 3G network load, or other statistics. This location may be derived from the cell id received in request 200a. After the selection the CM 220 creates an IP based connection to the NM 230 and sends a service request 200b to the NM 230 with all relevant client information included after which the NM 230 may allocate computing resources 232 for the given task. NM 230 may perform authentication for the CM 220 using for example a digital certificate. If the NM 230 is able and willing to allocate such resources it will confirm the service request back to CM 220. The availability of the allocated resources 232 may be limited to be valid only for a certain amount of time, accessed only using a specific URI provided in 200b, or the resource may be considered invalid if the first attempt to access the resource using the provided URI fails for any reason. If any such failure occurs, allocated resources 232 may be deallocated.

After NM 230 has finished with the resource allocation and related confirmation, CM 220 may send an SMS-message 200d to the defined CL 240 to set up a connection with the NM 230. Using a known digital certificate of the CM 220, CL 240 is able to authenticate the sender of the SMS 200d using a asymmetric public key infrastructure cryptography. In the SMS message 200d CM 220 may inform the CL 240 about the assigned NM 230 details, the given unique task identifier and the URI to which a new connection should be made. Using this information the CL 240 is able to establish a connection to the NM 230. Upon connection creation the CL 240 may send an authentication data to the NM 230, which then authenticates the CL 240 by bypassing the data to CM 220 and waits for a confirmation of the authentication. The authentication process instance in NM 230 authenticate mobile with the help of CM 220, keeps track on a time window that was priori set during a service request from CM 220, and also manage possible payment procedures any exists. Following the authentication the NM 230 and CL 240 are able to exchange data 200h. In this exchange of data NM 230 provides CL 240 detailed instructions about the preferred list of available WLAN networks 120. The selection of WLAN preferred WLAN networks, or Service Set Identifiers (SSID) hereafter, is carried out in a network selection process 234 in the NM 230. The list of SSIDs may be based on geographical location derived from the 3G cell-id received in a task allocation request 200b, or the NM 230 may request the CL 240 to provide list of SSIDs within its vicinity. Further the NM 230 will provide the required WLAN network credentials, such as WPA/WPA2 security keys, to the CL 240 when such credential exists. Following the message passing between CL 240 and the NM 230 the connection is closed and NM 230 may free the resources allocated for the task.

Figure 3:
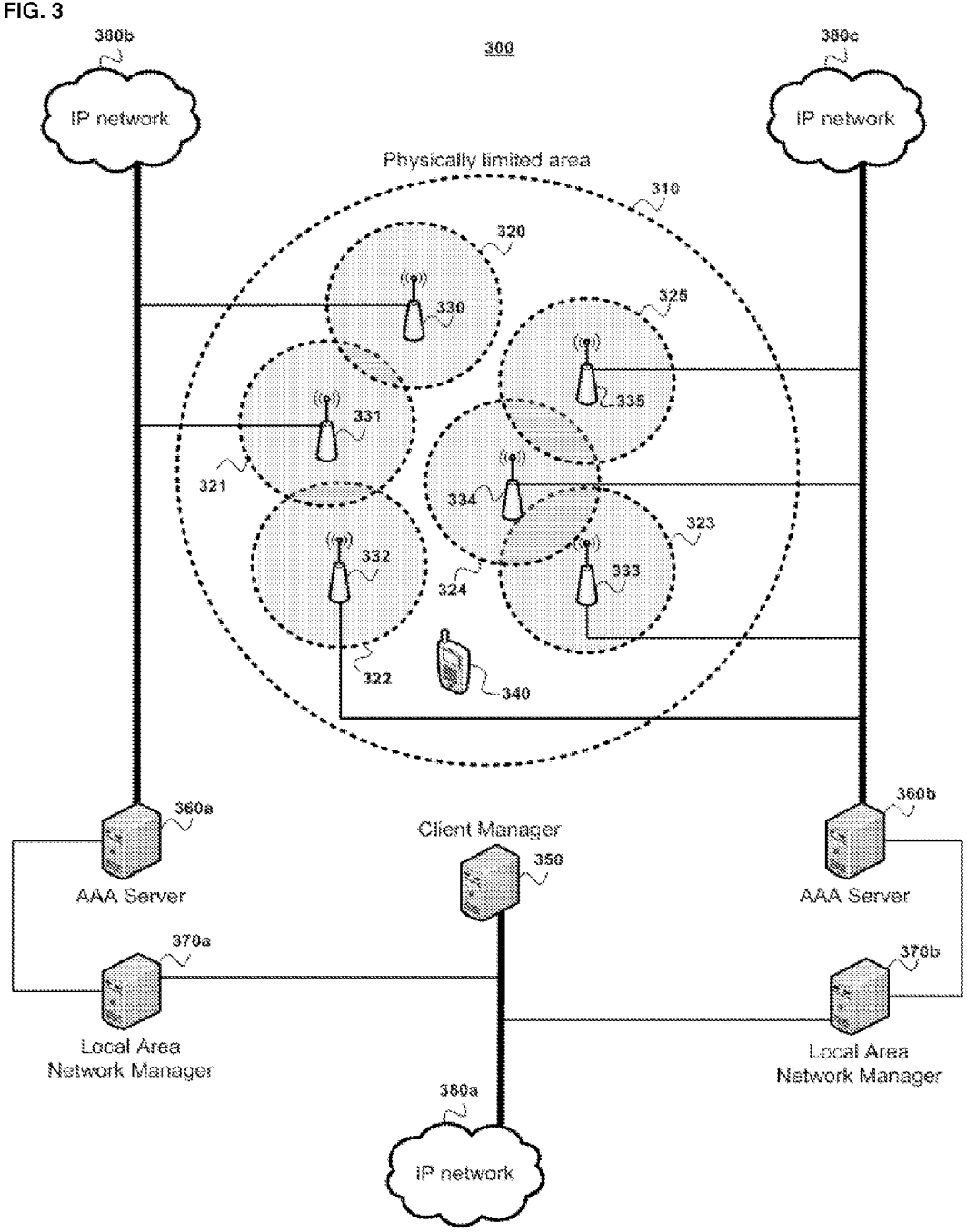
FIG. 3 is a block diagram showing the elements of the physically limited area with local area communications systems and related network server instances in accordance with preferred embodiments of the present invention.

According to a further aspect, the present invention may provide a system comprising a wide area access communication network 110; at least one local-access communication network 360a and 360b; local area network manager 370a and 370b; client manager 350; and a mobile client device 140 in FIG. 1 and 340 in FIG. 3, the system further comprising means, based on information from said networks and based on information from the mobile client, to coordinate, in respect of the client device, data off-loading between said networks. In an embodiment the information from the wide area access communication network include congested area expressed, for example, in terms of cell id or telephony number of mobiles in a congested area, the information from the area access communication network include authentication information and the information from mobile client include data rate, mobility and local area access right characteristics of the mobile client and the user of the mobile client.

Operations

The system 100 of FIG. 1 introduces the problem addressed in the various embodiments of the present invention where a mobile device 140 is connected to Internet 130 through a node 114 and related cellular network elements 116-119. The requirement of node 114 to concurrently serve numerous mobile devices results in congestion where all the mobile devices 140 served by the node 114 eventually suffer from low data bandwidth. On the hand, the area served by node 114 in most cases also has installed WLAN networks that as indicated may be managed by the same wide area operator as operating the 3G network or by some other operators or even private individuals.

One way to address the above mentioned problem is to install network management software to mobile device 140 forcing the mobile device to prefer Wi-Fi access to wide area network. The connection manager functionalities can already be found in mobile devices such as Apple iPhone and Nokia N900. This solution, however, does not address the following; the end user cannot be sure of the reliability of a previously unknown network, obtaining and using the credentials for authentication is a major hassle and off-loading may also lead to congestion in WLAN network if too many mobile devices do independent off-loading decisions. Neither does this solution address the how wide area operator can monitor the usage of WLAN network by its subscribers and provide a incentive for WLAN network operators to open their network for the wide area operator to off-load its traffic as alternative to wide area infrastructure investment.

The system 300 depicted in FIG. 3 introduce the geographically overlapping WLAN networks. WLAN Access Points (AP) 330-331 are operated by one operator and WLAN APs 332-335 are operated by second operator. Both WLAN networks are equipped with separate authentication, authorization and accounting (AAA) servers connected to the backbone IP networks 380b and 380c such that first AAA server 360a serves the APs 330-331 and second AAA server 360b servers the APs 332-335. The AAA server may be for example a Remote Authentication Dial-In User Service (RADIUS) server. As Mobile Device 340 establishes an internet access in the geographical area 310 it cannot access the said WLAN networks without valid authentication certificate. CM 220 is able to receive off-loading messages from 3G network 210. The said off-loading message identifies the mobile subscriber device 140, the cell-id of the wide area network cell in which the device 140 is operating in and an action proposal. In case of congested wide area node 114 or congested core network component such as SGSN 117 the action proposal proposes to off-load the client 140 from wide area network 110. When congestion no longer exists the reverse action statement may be received by the CM 220. For the WLAN network management system 300 in FIG. 3 introduce Local Area Network Managers (NM) 370a and 370b. As CM 150 receives an off-loading message it assigns a unique task in each NM 370a-370b. The unique tasks are combined with the addresses of the NM and sent to the mobile subscription identified in the off-loading message received from the wide area operator.

Figure 4:
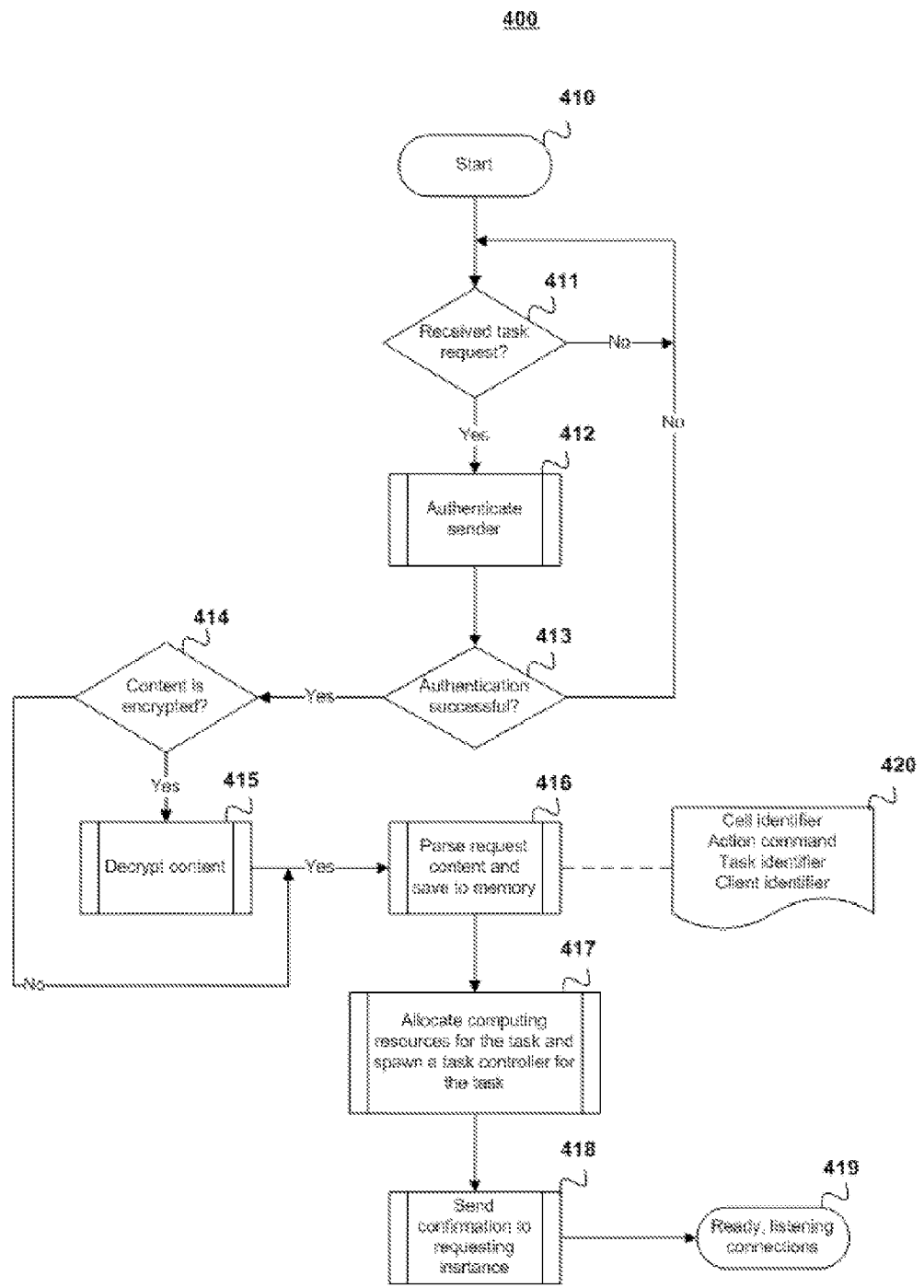
FIG. 4 is a flow diagram of a process for facilitating task request reception and related resource allocation in accordance with the preferred embodiments of present invention.

FIG. 4 depicts a flowchart of NM 230 process for handling a task request reception and related resource allocation in accordance with the preferred embodiments of present invention. The initial state of the Network Manager is assumed here so that it has its network interfaces configured so that it is able to build an IP connection to other servers in the network. The step 410 represents a state where the NM 230 is listening for new socket connections from a CM 220. If a new socket connection is created and further, a task request received in step 411 the NM 230 first authenticates the sender. The authentication is based on Public Key Infrastructure (PKI) such that the digital certificate of any trusted CM server is preinstalled on the NM server. Upon receiving the task request the NM 230 is then able to verify the identity of the sender using the public key available as a part of the aforementioned digital certificate. If the authentication fails if step 413 the NM 230 responds to the sender with a message indicating failure in authentication and updates any security measures that may be attached with the connection listening process.

Referring to FIG. 4, if successful the content received in the task request is checked against encryption that may, according to at least one embodiment of the present invention, be part of the authentication identity. The encryption and decryption also employs PKI and here the NM 230 will use its own private key to take out the plain text content. The requirement for encrypted task request is that the public key, e.g. digital signature, of the NM 230 is already known by the CM 220. Once the encryption is done in step 415 the content is put to a parser function in step 416 and the values are stored to local memory in the NM server 230. The values may be, for example, wide area network cell id, wide area network 210 originated action command, a unique task identifier, and a unique mobile client 240 identifier such as telephone number, IMSI, TMSI, IMEI code or similar. After successfully storing the task request information the NM server 230 triggers a new handler instance for the received task in step 417. The handler may be for example a software process or a software thread. In addition the NM server 230 assigns a listener in step 418 to the URI that can be identified by combining the NM server address and the task identifier earlier received from the CM 220. The listener may be configured with various security measures such as a limited time window for connection requests or the listener may be invalidated after a specific amount of failed connection requests to the URI. The final state in FIG. 4 refers to a state where the NM 230 is not only ready for incoming client connections but also ready for any further task requests from CM 220.

Figure 5:
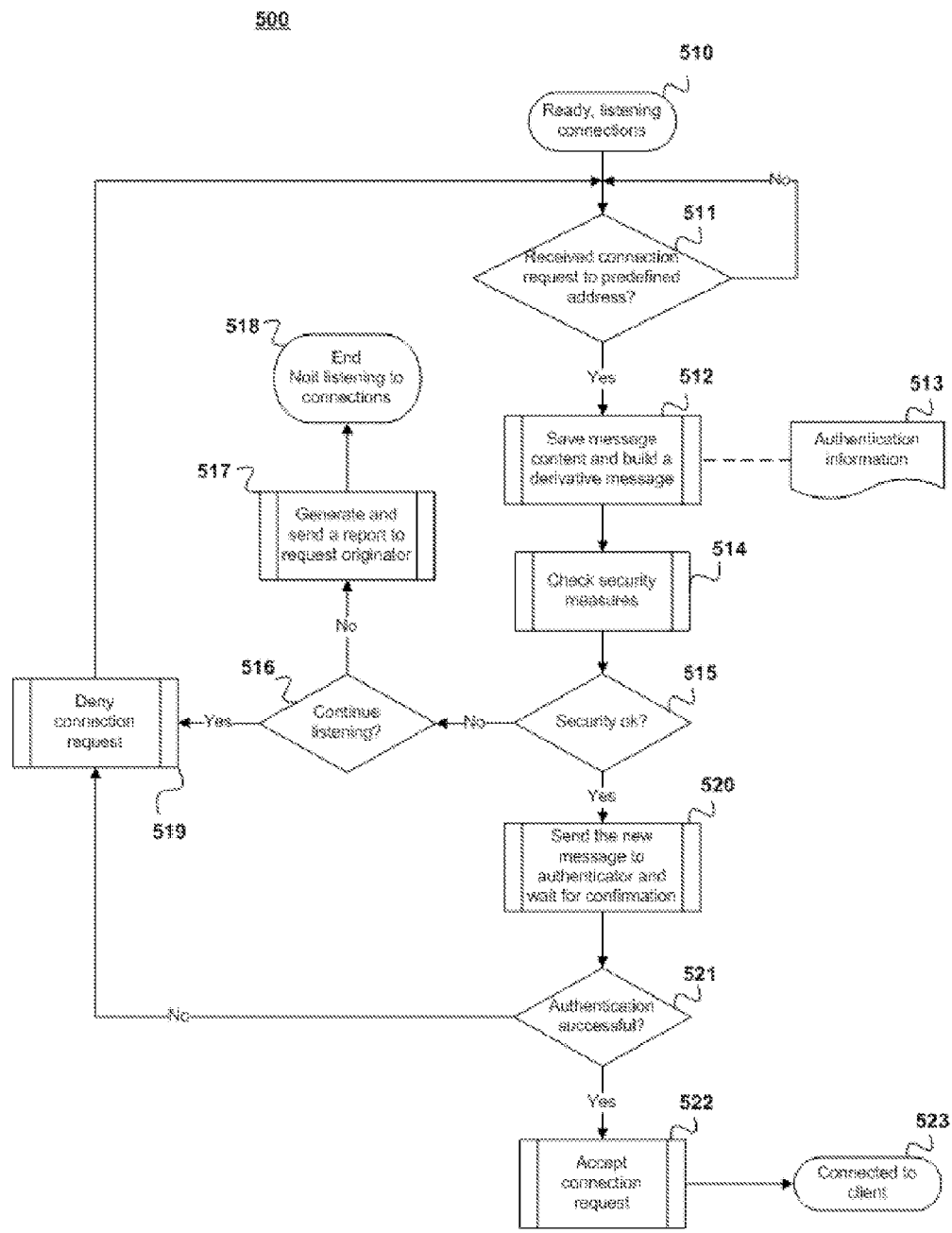
FIG. 5 is a flow diagram of a process for listening client connection requests and corresponding authentication in accordance with preferred embodiments of the present invention.

Referring to FIG. 5 where a flow diagram of a process for listening client connection requests and corresponding authentication is explained in accordance with the preferred embodiments of present invention. The flowchart further explains the actions when the NM 230 has accomplished at least once the state where it is listening for incoming client 240 connections. Upon connection request from mobile client in step 511 the target URI of the connection is validated against the one formed earlier according to a preferred embodiment of the present invention. If such connection request is received the NM 230 stores any content that may be included in the connection request and forms derivative information in step 512 that is stored in memory for later processing. Also at this point the handling process may check security measures against the connection request in step 514. This procedure may involve for example filtering of unwanted client addresses, checking the timer value set to limit the time between CM 220 originated task request and the client 240 originated connection request, or validating any check-sum or similar message integrity value. If the initial security check is passed in step 515 the information generated in step 512 is then passed to the CM 240 in step 520 using the socket connection that was opened upon task request from CM 220.

Referring to FIG. 5, the NM 230 will prevent any data from passing between it and the mobile client 240 that is requesting a connection until the CM 220 returns a positive indication to the authentication request that included the information generated in step 512. The authentication logic follows, according to some embodiments of the present invention, PKI such that the client 240 provides a secret that may for example be the telephone number, IMEI, IMSI, TMSI, or an online service username that is encrypted with the public key of the CM 220. That key may be extracted from a preinstalled digital certificate of the said CM 220. Once the CM 220 receives the message from NM 230 with at least this encrypted secret information it is able to verify the original sender as it has access to the same identification information as the mobile client 240, the client being the subscriber of the operator managing the CM 220. If the authentication indication is unsuccessful in step 521 the NM 230 denies the client connection request in step 519 and continues listening for new connection requests provided that the security measures, such as time window for connection requests, allow that. In successful authentication the connection request is accepted in step 522 and the connection between client 240 and NM 230 is established and active. If, in step 515, the security check does not satisfy the requirements further configurations are validated in step 516 to decide if the listening process should continue listening for incoming connections in the context of the present task. If any following connection requests are allowed the current request is rejected in step 519 otherwise, according to various embodiments of the present invention, the NM 230 will generate a status report with session details and send the report to the CM 220 in step 517. In the final state, 518 in FIG. 5, listening process is destroyed and all resources allocated for the task the process was serving are released.

Figure 6:
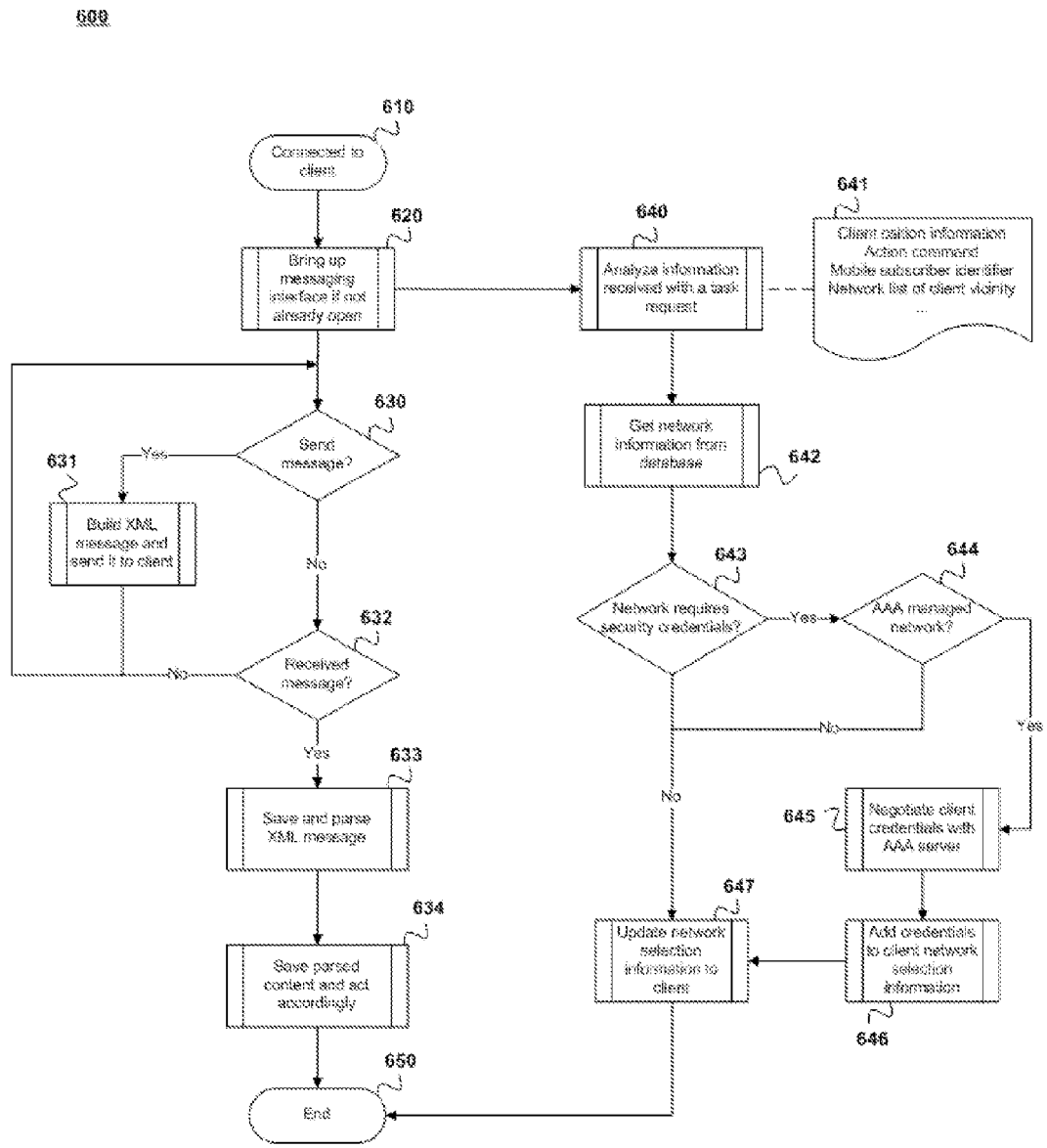
FIG. 6 is a flow diagram of a process for facilitating network selection and XML message sending in accordance with preferred embodiments of the present invention.

FIG. 6 discloses a flowchart of a process for facilitating network selection and XML message sending in accordance with at least one embodiment of the present invention. The state 610 represents the state where the flow graphs of FIG. 4 and FIG. 5 are successfully passed. In step 620 the system initializes a message exchange interface between the client 240 and the NM 230. This may, in accordance with at least on embodiment of the present invention, include establishing a peer protocol session such as a HTTP protocol session between the said client and the NM. Steps 630-634 represent the basic send and receive loop where the previously configured message interface is able to send and receive messages that may be in XML format. The message exchange may internally in NM 230 use a service communication method that uses indirect event based message communication in which message originator do not need to know who is or who are the receivers of the message. Receivers them self are responsible to indicate that they are interested in the message of defined scope or topic. The message structure is well defined and now by both parties where the structure consist of a header and a body. Message header can define the event to be used to indicate the topic of the message and that a message has arrived.

Again, referring to FIG. 6, the steps 640-647 represent the actions taken sending network selection guidance message to the client 240. It begins with the analysis of CM 220 originated information in step 641, where this information is used to narrow the search of suitable local area networks from the network database ion NM 230. In step 642 the said database search Is executed according to preferred embodiments of the present invention. Here the search takes in to consideration the CM 220 originated, client 240 originated, and NM 230 originated information that may narrow the search of local area networks from the database. While other security credentials, such as WLAN WPA/WPA2 security keys, may be stored in the database a selected local area network may require third party authentication, such as EAP, to be used to gain access to the said network. This is handled in step 645 and 646 where the NM 230 may cache the security detail locally and later provide those to the client 240, or leave the authentication procedure to the client 240 and only provide the AAA server configuration to the said client. Once a single or multiple local area networks are considered suitable and all necessary details to join the said networks exists the NM 230 sends a network selection update to the client 240 using the message exchange interface described in the reference to FIG. 6 steps 620-634.

Security Embodiment

Figure 7:
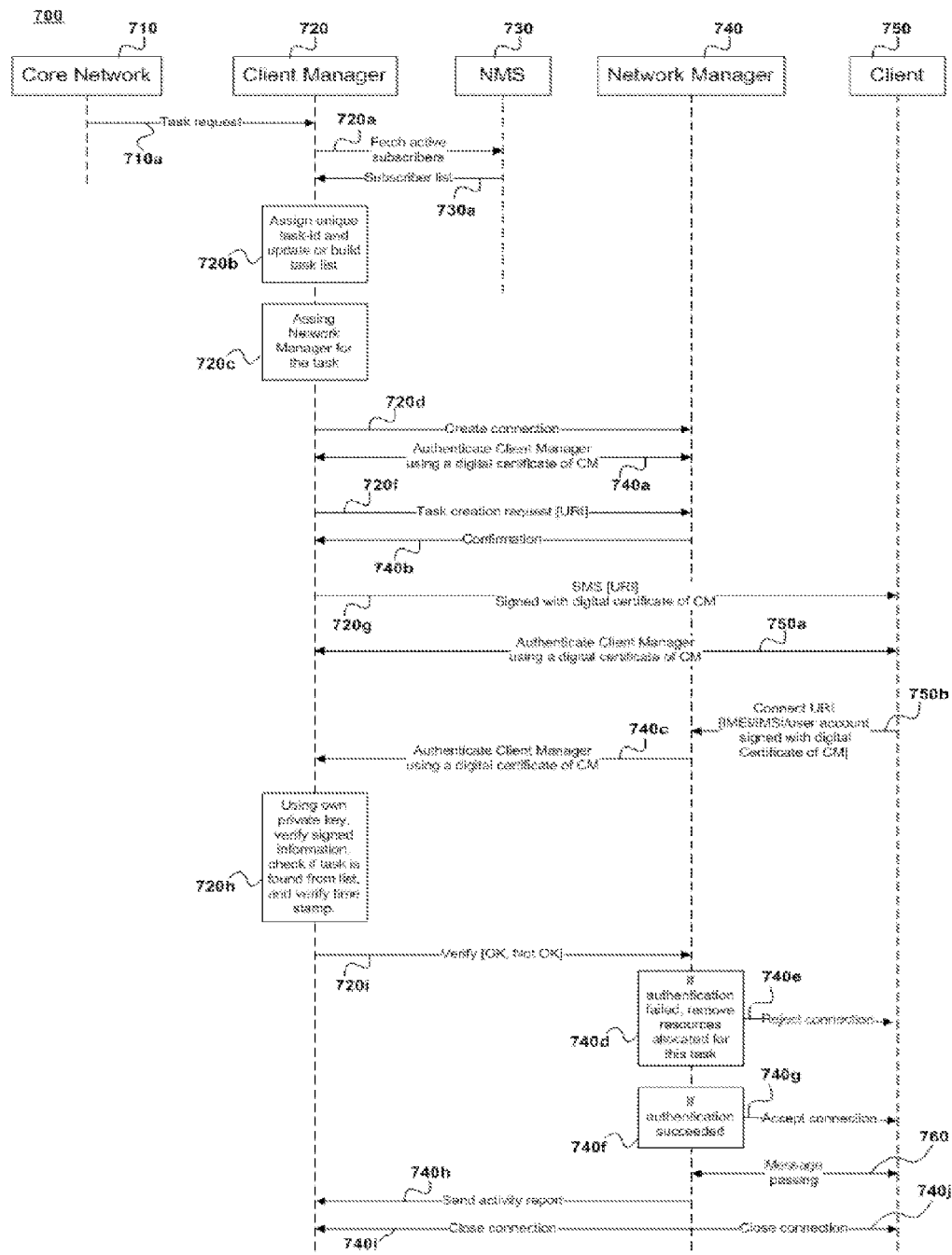
FIG. 7 is a sequence diagram of the exemplary security process used between the client and the network side instances in accordance with preferred embodiments of the invention.

FIG. 7 is a sequence diagram of the exemplary security process used between the client and the network side instances in accordance with the preferred embodiments of the invention. The sequence begins with the perquisite task update request 710a originated from core network 710 or a off-load guidance request from client 750. This follows some kind of a subscriber list report originated from core network instances such as visitor location register or Network Management System 730. CM allocates unique task identifier 720b and creates a dedicated handler for the task and selects at least one NM to serve the said task. A connection between CM and selected NM is the created 720d where the initiator is the CM 720 and acceptor is the NM 740. The acceptor can authenticate the initiator using a pre-installed digital certificate of initiator and following the successful authentication CM 720 will request the NM 710 to allocate adequate resources for the soon to be served off-loading task. If positive confirmation is received in the CM 720 it sends the URI and a task identifier to the client 750. The client 710 then authenticates the sender using a pre-installed digital certificate and again, if successful, encrypts selected user information such as its IMEI/IMSI/TMSI or a service username with the public key uncoupled from the same digital certificate that was used to authenticate the CM 720. This encrypted information is provided upon creating an IP connection to the NM 740 addressed by the combination of the URI and task identifier provided in the previously received SMS message. Once the NM 740 accepts the connection request it passes the encrypted information to the CM 720 using the same connection, if still valid, that was created earlier by the CM 720. CM 720 then either confirms or rejects the identity of the client 710. The security feature may also include time window for the client 750 to NM 740 connection establishment and/or limited trials for the said connection establishment. If the identity was confirmed, the client 750 and NM 740 may continue exchanging data.

Signaling in Some Embodiments of the Invention

Figure 11:
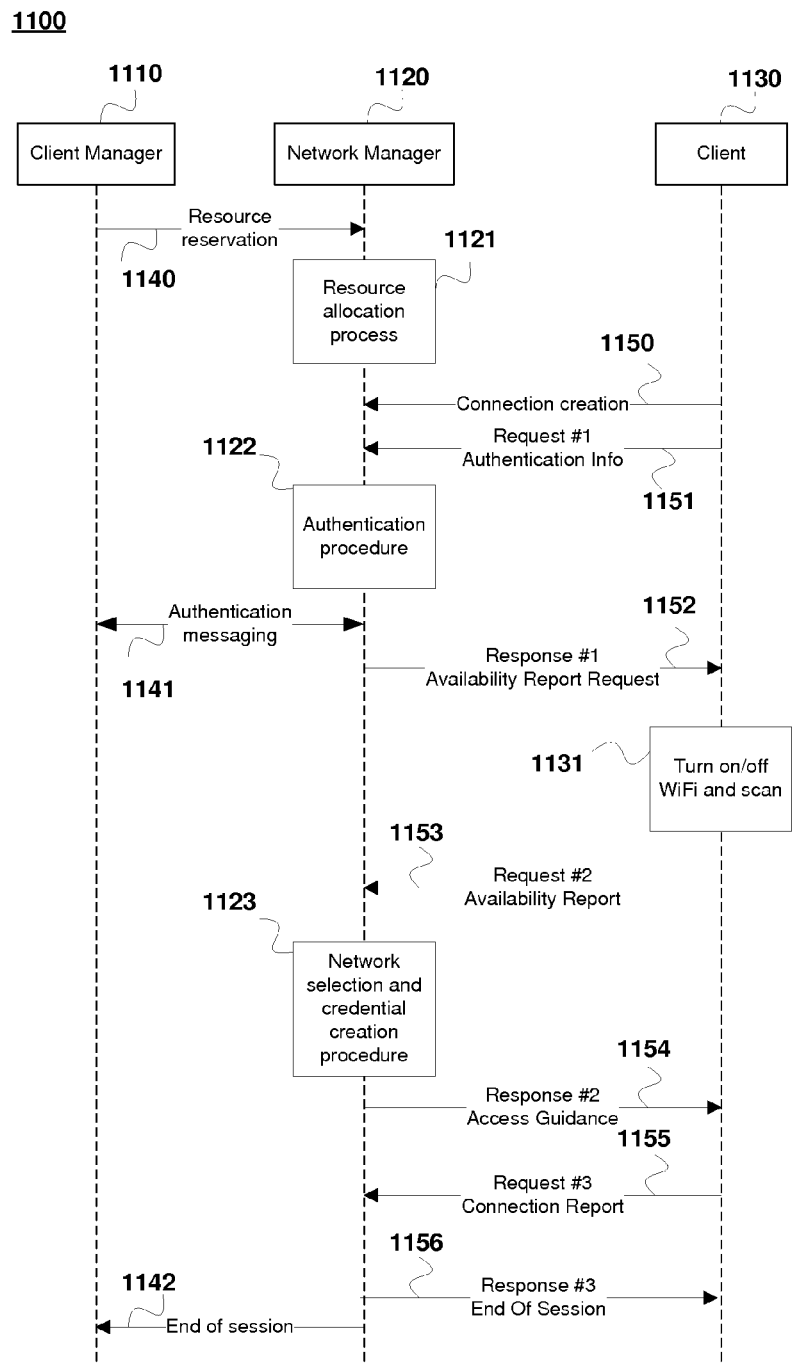
FIG. 11 illustrates an example on some aspects of signaling between the network manager and the client manager as well as between the network manager and the client according to an embodiment of the invention.

FIG. 11 illustrates an example on some aspects of signaling between the network manager 1120 and the client manager 1110 as well as between the network manager 1120 and the client 1130 according to an embodiment of the invention. FIG. 11 further illustrates some aspects of processing in the network manager 1120 and the client 1130 associated with the signals exchanged therebetween. The network manager 1120 may be for example the network manager 230 illustrated in FIG. 2 or the network manager 720 of FIG. 7. The client manager 1110 may be for example the client manager 220 of FIG. 2 or the client manager 720 of FIG. 7. The client may be for example the client 240 of FIG. 2 or the client 750 of FIG. 7.

The network manager 1120 receives a request for a resource reservation 1140 from the client manager 1110 in order the allocate local area network resources for the client

1130. In response to the resource reservation 1140, the network manager 1121 performs a resource allocation process 1121 to allocate computational resources, memory resources, communication resources and/or other resources required for providing the resources requested in the resource reservation 1140. The allocated resources may be assigned an identifier. Subsequently, the network manager 1120 may receive a connection request from the client 1130 to initiate a connection creation 1150 process between the client 1130 and the network manager 1120. The connection creation may comprise the client 1130 providing a first request 1151 comprising authentication information, such as an authentication certificate to the network manager 1120. Alternatively, the process for connection creation 1150 may be separate from the first request 1151, for example comprising dedicated connection creation signalling The first request 1151 may further comprise for example an identifier associated with the client 1130 and/or an identifier associated with resources allocated at the network manager 1120 in response to the request for resource reservation 1140. The first request 1151 may comprise content defined according to the xml code below.

```
<xs:element name="uCLauthInfo" type="body_uCLauthInfo"/>
<xs:complexType name="body_uCLauthInfo">
    <xs:sequence>
        <xs:element name="response" type="xs:string"/>
    </xs:sequence>
</xs:complexType>
```

In response to receiving the authentication information, the network manager 1120 performs an authentication procedure 1122 based at least in part on the authentication information received in the first request 1151. As part of the authentication procedure 1122, or as a consequence of the authentication procedure 1122, the network manager 1120 carries out authentication messaging 1141 with the client manager 1110. As an example, the authentication messaging 1141 may comprise an authentication request sent by the network manager 1120, the authentication request comprising an authentication certificate received from the client 1130 and an authentication response received by the network manager 1120, the authentication response comprising an authentication confirmation. Additionally, the authentication messaging 1141 may involve the network manager 1120 sending and/or receiving one or more additional messages related to the authentication procedure 1122.

In response to a successful outcome from the authentication messaging 1141, such as receiving an authentication confirmation, the network manager 1120 accepts the connection request from the client 1130, thereby completing the connection creation 1150. Consequently, the network manager 1120 may provide a first response 1152 to the client 1130. The first response may comprise, for example, an availability report request to the client 1130, comprising information regarding one or more local area networks that may be available for the client 1130 to access, defined e.g. by their SSIDs. As an example, the first response 1152 may comprise content defined according to the xml code below.

```
<xs:element name="uCLavailabilityReportReq"
type="body_uCLavailabilityReportReq">
<xs:complexType name="body_uCLavailabilityReportReq">
    <xs:sequence>
        <xs:element name="ssid" type="xs:string" minOccurs="0"
            maxOccurs="unbounded"/>
    </xs:sequence>
</xs:complexType>
```

In response to receiving the first response 1152, the client 1130 provides a second request 1153 to the network manager 1120. The second request 1153 may comprise further information regarding the client, such as information related to the current location of the client 1130. The information related to the location may comprise for example, information indicating the geographical location of the client 1130, such as GPS coordinates or the like and/or information indicating a cell of a cellular network the client 1130 currently resides in. In case the first response 1152 comprises an availability report request, the second request 1153 may further comprise an availability report. If this is the case, in order to determine information to be included in the availability report, the client 1130 may activate the local area network interface, such as WiFi interface, search for available local area networks in its vicinity, and determine information, such as SSIDs, identifying the local area networks found in the search to be included in the availability report. In case the first response 1152 comprises information regarding one or more local area networks that may be available for the client 1130 to access, the client 1130 verifies the availability of these local area networks. Consequently, the client 1130 may provide the outcome of availability verification, for example indication for each of the one more local area networks under verification whether the respective network was really available or not, as part of or in addition to the second request 1153 to the network manager 1120. As an example, the second request 1153 may comprise content defined according to the xml code below.

```
<xs:element name="uCLavailabilityReport"
type="body_uCLavailabilityReport"/>
<xs:complexType name="body_uCLavailabilityReport">
    <xs:sequence>
        <xs:element name="ownLocation" type="t_location"
            minOccurs="0" maxOccurs="1"/>
        <xs:element name="ownCell" type="xs:string"
            minOccurs="0" maxOccurs="1"/>
        <xs:element name="availabilityReportWiFi"
            type="t_availabilityReportWiFi" minOccurs="0"
            maxOccurs="unbounded"/>
    </xs:sequence>
</xs:complexType>
```

As an alternative or as a further response to a successful outcome of the authentication messaging 1141, the network manager 1120 performs network selection and credential creation procedure 1123. The network selection process may consider the local area networks identified in the availability report received within the second request 1153 from the client 1130 and/or other local area networks the network manager 1120 considers suitable. As a result, the network manager 1120 determines one or more local area networks, identified for example by their SSIDs and, for each of the determined one or more local area networks, obtains or determines credentials required to access the local area network. Consequently, the network manager provides a second response 1154, comprising access guidance, to the client 1130. The access guidance comprises, for each of the determined one or more local area networks, information regarding the local area network, such as indication of the access point of the local area network, (geographical) location of the local area network, credentials required to access the local area network, and/or traffic limitations associated with the local area network. As an example, the second response 1154 may comprise content defined according to the xml code below.

```
<xs:element name="uCLaccessGuidance"
type="body_uCLaccessGuidance"/>
<xs:complexType name="body_uCLaccessGuidance">
    <xs:sequence>
        <xs:element name="accessInfoWiFi" type="t_accessInfoWiFi"
        minOccurs="1" maxOccurs="unbounded"/>
    </xs:sequence>
</xs:complexType>
<xs:complexType name="t_accessInfoWiFi">
    <xs:sequence>
        <xs:element name="accessPoint" type="t_accessPointWiFi"/>
        <xs:element name="username" type="xs:string"
        minOccurs="0" maxOccurs="1"/>
        <xs:element name="credentials" type="xs:string"
        minOccurs="0" maxOccurs="1"/>
        <xs:element name="location" type="xs:string"
        minOccurs="0" maxOccurs="1"/>
        <xs:element name="allowedTraffic" type="t_allowedTraffic"
        minOccurs="0" maxOccurs="1"/>
    </xs:sequence>
</xs:complexType>
```

In response to receiving the second response 1154, the client 1130 may access any of the determined one or more local area networks identified in the second response 1154 and initiate the data transfer. Once the data transfer over the local area network the client 1130 chose to access, the client 1130 may provide a third request 1155 to the network manager 1120, comprising a connection report. The connection report may comprise for example information regarding the local area network accessed, information regarding the duration of the data transfer, information regarding the amount of the data transferred, and/or (other) statistics on the usage of the local area network connection. As an example, the third request 1155 may comprise content defined according to the xml code below.

```
<xs:element name="uCLconnectionReport"
type="body_uCLconnectionReport"/>
<xs:complexType name="body_uCLconnectionReport">
    <xs:sequence>
        <xs:element name="connectedAccessPoint"
        type="t_accessPointWiFi" minOccurs="0"
        maxOccurs="unbounded"/>
        <xs:element name="connectedSince" type="xs:time"
        minOccurs="0" maxOccurs="unbounded"/>
        <xs:element name="trafficStatistics"
        type="t_ipTrafficStatistics" minOccurs="0"
        maxOccurs="unbounded"/>
    </xs:sequence>
</xs:complexType>
```

In response to reception of the third request 1154, the network manager 1120 may issue a third response, comprising an indication about an end of the session, thereby closing the connection to the client 1130. Furthermore, the network manager 1120 may send an indication about the end of the session 1142 also to the client manager 1110.

Implementation Embodiment

Figure 8:
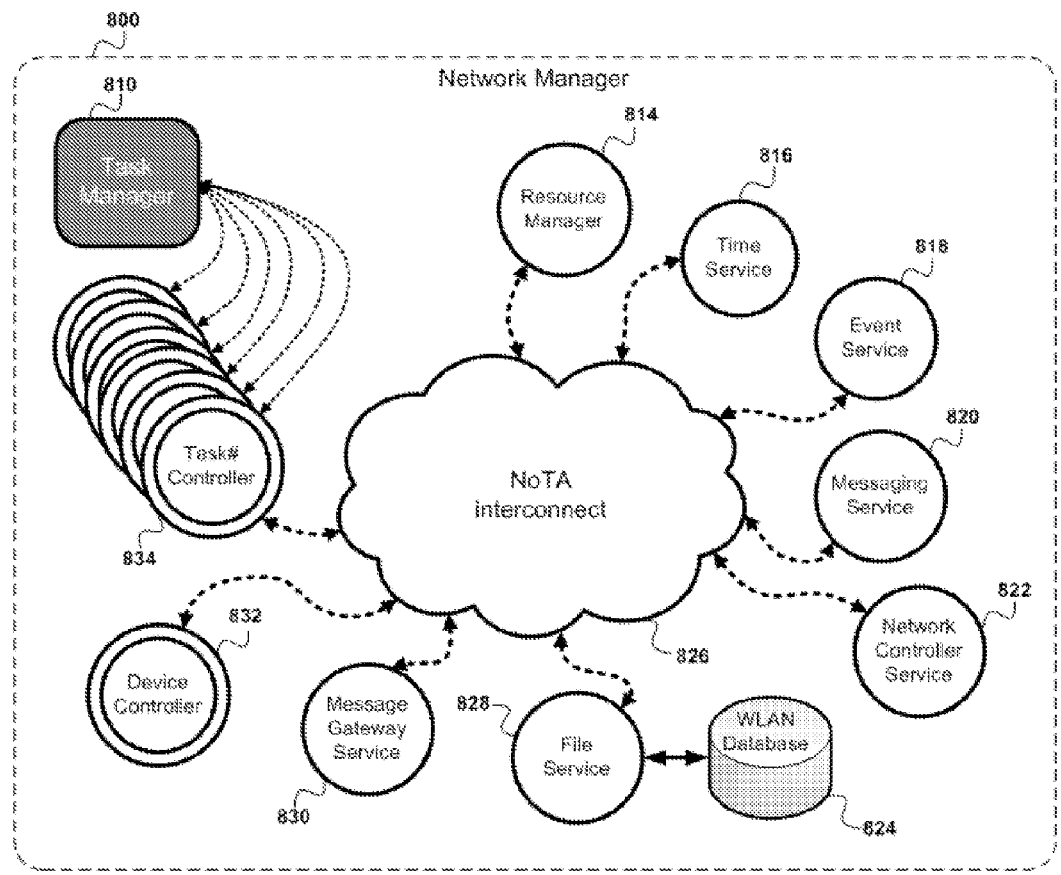
FIG. 8 is a block diagram of exemplary implementation architecture of the network manager in accordance with preferred embodiments of the present invention.

FIG. 8 discloses a block diagram of an example implementation of the network manager 230 described in the various embodiments of the present invention based on Network on Terminal Architecture (NoTA). For simplicity only the assigned functionality of each element are described here leaving the details of implementation open.

Referring to FIG. 8, the Task Manager 810 is an application that communicates with the Client Manager 220 and uses the task identifier received upon task request and spawn identifier specific task control processes or application nodes 834 to the system. Each Task# Controller 834 is alive during the session with the client identified with the task identifier. Once the client 240 is trying to establish a connection the Network Manager 800 the Task# Controlled assigned to serve the client executes the authentication procedure described in the various embodiments of the present invention. If the connection is eventually established each Task# Controller 834 also keep statistics and collect reports for each client and further creates reports to the Client Manager 220. When the connection the mobile client 240 is closed and signaled by the Device Controller 832 the Task# Controller sends a final report about the client session to the CM 220 and releases the resources allocated for the task. Also the Task Manager 810 will update its internal databases to cope with the changed system status, i.e. that there is one less task controller instance active in the system.

Again, referring to FIG. 8, the Resource Manager 814 is a service node SN that controls the usage of service nodes in the system. These service nodes are for example: Time Service 816 producing timing functions, Event Service 818 that produce system wide events to various ANs and SNs, and Messaging Service 820 that provide the system for means to exchange XML messages between each node connected to the NoTA interconnect. Network Controller 822 is service node and the primary user of the File Service 828. It uses the File Service 828 to access the local area network database 824, which hold all details about the local area networks and corresponding access points that the Network Manager 800 is able to control. The said details also include access keys to said networks and if the access to the network requires advanced, centralized, authentication such as Extensible Authentication Protocol (EAP) the Network Controller Service 822 is able to communicate with external AAA server thus provide the means for the mobile client to get authentication credentials to access the local area network. File service 828 provides an interface for ANs and SNs to access platform file system or any database system 824, like MySQL or PostgreSQL. Message Gateway Service is a service node connected to the interconnect 826 that enables XML message exchange with similar entity in the mobile client 240. This service is an extensive client to the Messaging service 820. Device Controller is a NoTA application node that uses all the system services described earlier to enable communication and information sharing between the NM 800 and the mobile client 240. It uses the Network Controller Service to determine local area network information, generates an XML guidance message and the use Message Gateway Service 830 to send it to the client. Once the connection is closed either by client request, unexpected, followed by a request from the CM 220, or as a consequence of NM 800 internal trigger, the specific task allocated to serve the specific client identified with the task identifier is removed from the system, all connections are closed and a final report to the CM 220 is sent.

Figure 9:
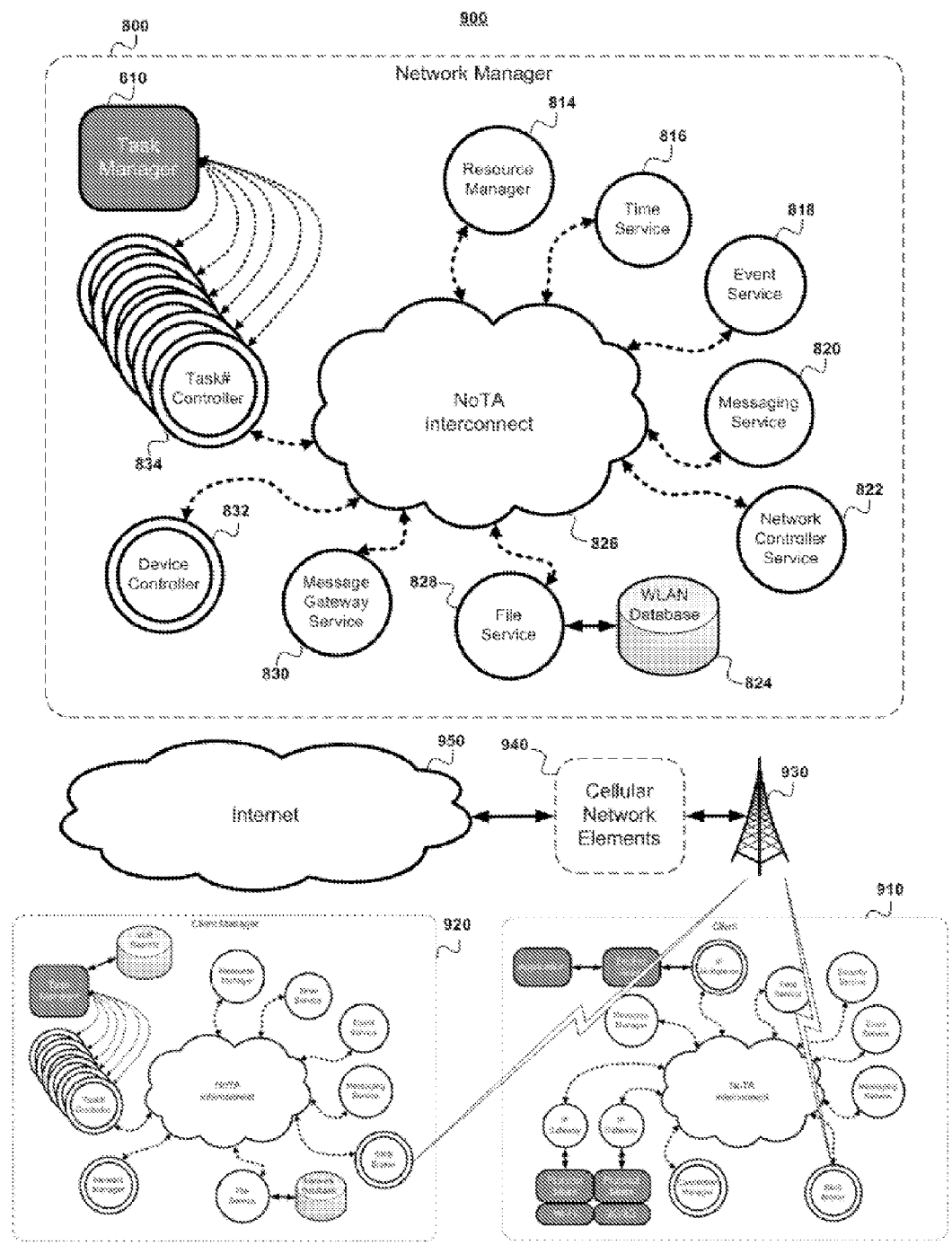
FIG. 9 is a block diagram of exemplary implementation architecture of the network manager, client and the client manager instances in accordance with preferred embodiments of the present invention.

FIG. 9 discloses a block diagram of an example implementation of the system 200 based on Network on Terminal Architecture (NoTA).

Figure 10:
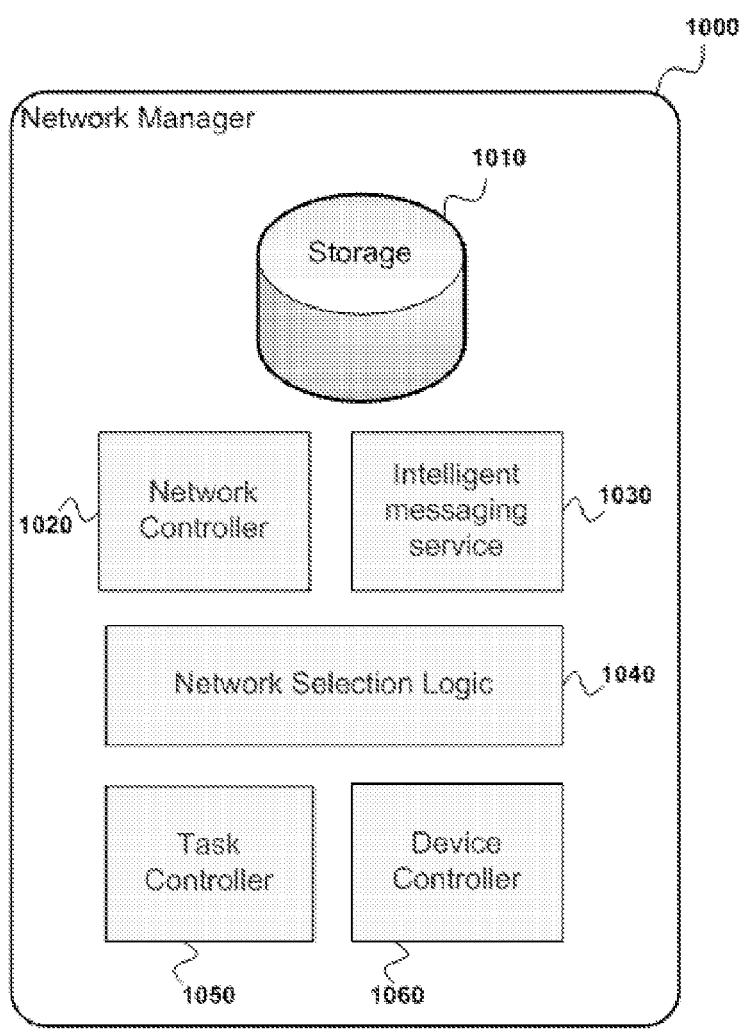
FIG. 10 is a block diagram of the exemplary network manager internal functional architecture in accordance with preferred embodiments of the present invention.

The computer in FIG. 10 presents an implementation of NM according to one embodiment. The computer system includes Task Controller 1050 responsible for communicating with the CM 220. It allocates the local resources, such as dynamic memory, upon CM 220 request and manages the authentication of client 240. The authentication process could implement the authentication functions described in the previous embodiments of the present invention. Further it may generate reports comprising for example WLAN network load, client density in networks, security countermeasures, and send the report to CM 220 either on predefined interval or upon request. The task controller may be implemented for example as a daemon process that is able to fork multiple processes or similar for each requested task. Once the requested task is signaled to end the Task Manager 1050 takes care of the garbage collection and resource release.

Referring to FIG. 10, the Device Control 1060 is responsible for communication with the mobile client. Device Control 1060 may for example instantiate a new communication protocol object, such as NoTA Device Interconnect Protocol, for each new approved client connection that may later be used for messaging between the NM 1000 and the mobile client. The messaging handled in Device controller may include generating messages in XML format and using the communication protocol object, instantiated earlier, transferring that to the mobile client. Furthermore the Device Controller 1060 is also responsible for receiving and parsing the incoming XML messages and assigning queries to Network Controller 1020 in order to send guidance for network selection to the mobile client. The Network Controller 1020 select appropriate local area network details and access point details within the said network from the database stored in the memory 1010.

Referring to FIG. 10, The Network Controller 1010 uses the services of the intelligent Network Selection Logic 1040 to select a one or a set of suitable local area networks and access points to be sent to the mobile client as a local area data off-load guidance. The Network Selection Logic 1040 takes advantage of various information pieces originated from the CM 220 and the mobile client 240 and any information the NM 1000 may possess itself while looking for suitable local area networks from the database 1010. The aforementioned pieces of information may include position information based on wide area network cell id, GPS coordinates of the client, network statistics based on the reports received from the local area network access points, or similar. It may also be that the algorithm running the Network Selection Logic 1040 takes into account any guidance information from CM 220. Such guidance could be dependent on contracts between local area and wide area operators, pricing policy, or even the result of the aforementioned online auction. The Intelligent Messaging Service 1030 may represent a part of the Device Controller 1060. This service essentially implements the XML message exchange.

Although the features and elements of the present invention are described in the previous embodiments in specific combinations, each feature or element can be used alone without the other features or elements of the embodiments or in a various combinations with or without the other features or elements of the present invention.

The following numbered clauses describe some embodiments of the invention.

Clause 1. A method comprising, receiving at least one task request from first device, allocating memory and computing resources for said task, associating said memory and computing resources with unique identifier, returning a confirmation about the capability to perform the requested task to said first device, waiting a connection request from a second device with valid task id and an authentication certificate, forwarding the said authentication certificate to the first device, receiving authentication confirmation from the first device, accepting said connection request from the second device, indicating at least one local area network identifier for the second device, and providing required credentials to the second device to access the said local area network.

Clause 2. The method as described in clause 1, further comprising receiving a location indicator of the second device from the first device; and using it at least partly to select at least one local network; and indicating the selected local networks to the second device.

Clause 3. The method as described in clause 1, further comprising receiving the unique identifier of the task from the first device.

Clause 4. The method as described in clause 1, further comprising associating a timer for the allocated memory and computing resources; and invalidating said resources if no connection request has been received from a second device within the duration specified by the said timer.

Clause 5. The method as described in clause 1, further comprising denying all connection requests without the valid task id.

Clause 6. The method as described in clause 1, further comprising requesting the second device to report available local area networks; and using it at least partly to select at least one local network; and indicating the selected local networks to the second device.

Clause 7. A system comprising, a processor system consisting one or more processors capable to execute program code, at least one memory including computer program code, and at least one communications interface, at least one memory and computer and the computer program configured to, with the at least one processor, cause the system to perform at least the following: receive at least one task request from first device, allocate memory and computing resources for said task, associate said memory and computing resources with unique identifier, return a confirmation about the capability to perform the requested task to said first device, wait a connection request from a second device with valid task id and an authentication certificate, forward the said authentication certificate to the first device, receive authentication confirmation from the first device, accept said connection request from the second device, indicate at least one local area network identifier for the second device, and provide required credentials to the second device to access the said local area network.

Clause 8. The system as described in clause 7 further comprising receiving a location indicator of the second device from the first device; and using it at least partly to select at least one local network; and indicating the selected local networks to the second device.

Clause 9. The system as described in clause 7, further comprising receiving the unique identifier of the task from the first device.

Clause 10. The system as described in clause 7, further comprising associating a timer for the allocated memory and computing resources; and invalidating said resources if no connection request has been received from a second device within the duration specified by the said timer.

Clause 11. The system as described in clause 7, further comprising denying all connection requests without the valid task id.

Clause 12. The system as described in clause 7, further comprising requesting the second device to report available local area networks; and using it at least partly to select at least one local network; and indicating the selected local networks to the second device.

Clause 13. The system as described in clause 7, wherein the communications interface is an Ethernet card.

What is claimed is:

1. A method for managing local area network resources in a first server, the method comprising the first server performing the steps of:
receiving a service request from a second server regarding services for a user device;

allocating resources for said service by associating a timer that sets a time limit for accessing the allocated resource, and invalidating said resources when a connection request has not been received from the user device within a duration specified by said timer;

associating said allocated resources with a first unique identifier;

confirming said service request with said second server;

receiving a connection request from the user device, the connection request comprising the first unique identifier and an authentication certificate;

passing said authentication certificate to the second server;

receiving an authentication confirmation from the second server; and in response to receiving said authentication confirmation,
accepting said connection request from the user device;
providing an identification of at least one local area network to the user device; and
providing required access credentials associated with said at least one local area network to the user device.

2. The method of claim 1, wherein said service request comprises a location indicator of the user device, and wherein providing the identification of the at least one local area network comprises selecting the local area network based at least in part on said location indicator.

3. The method of claim 1, wherein said service request comprises the first unique identifier.

4. The method of claim 1, further comprising receiving a connection request comprising a second unique identifier, and denying said connection request.

5. The method of claim 1, further comprising requesting the user device to report available local area networks, and wherein the step of providing the identification of the local area network comprises selecting the local area network based at least in part on said available local area networks.

6. The method of claim 1, wherein the step of providing the identification of the at least one local area network comprises selecting the local area network based at least in part on guidance information from the second server, wherein said guidance information comprises information regarding an online auction.

7. An apparatus comprising:
a hardware processor capable of executing program code;
a timer; and
at least one memory comprising computer program code, wherein the computer program code is configured to, when executed by the hardware processor, cause the apparatus to operate as a first server that is arranged to,
receive a service request from a second server regarding services for a user device;
allocate resources for the service request by using the timer to set a time limit for accessing the allocated resource, and invalidate said resources when a connection request has not been received from the user device within a duration specified by the timer;
associate said allocated resources with a first unique identifier;
confirm said service request with the second server;
receive, from the user device, a connection request comprising the first unique identifier and an authentication certificate;
pass said authentication certificate to the second server;
receive an authentication confirmation from the second server; and
in response to reception of said authentication confirmation,
accept said connection request from the user device;
provide an identification of at least one local area network to the user device; and
provide required access credentials associated with said at least one local area network to the user device.

8. The apparatus of claim 7, wherein said service request comprises a location indicator of the user device, and wherein providing the identification of the local area network comprises selecting the local area network based at least in part on said location indicator.

9. The apparatus of claim 7, wherein said service request comprises the first unique identifier.

10. The apparatus of claim 7, wherein the program code is further configured to, when executed by the processor system, cause the apparatus to receive a connection request comprising a second unique identifier, and deny said connection request.

11. The apparatus of claim 7, wherein the program code is further configured to, when executed by the processor system, cause the apparatus to request the user device to report available local area networks, and wherein providing the identification of the at least one local area network comprises selecting the local area network based at least in part on said available local area networks.

12. The apparatus of claim 7, wherein providing the identification of the at least one local area network comprises selecting the local area network based at least in part on guidance information from the second server, wherein said guidance information comprises information regarding an online auction.

13. The apparatus of claim 7, wherein the apparatus is configured to communicate with at least one of the second server and the user device over a communications interface comprising an Ethernet card.

* * * * *